Patented Nov. 30, 1937

2,100,998

UNITED STATES PATENT OFFICE 2,100,998

PRESERVATION OF RUBBER

Robert L. Sibley, Nitro, W. Va., assignor, by mesne assignments, to Monsanto Chemical Company, St. Louis, Mo., a corporation of Delaware No Drawing. Application March 9, 1935, Serial No. 10,175

13 Claims. (Cl. 18—50)

The present invention relates to the art of rubber manufacture, and particularly relates to the preparation of rubber compounds which resist deterioration due to the effects of heat and/or oxygen. It has long been known that such deterioration can be retarded to a certain degree by treating the rubber either before or after vulcanization with certain substances known as age-resisters or antioxidants. One object of the invention is to provide a superior class of antioxidants for rubber. A further object of this invention is to provide a class of materials which, when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual service.

The age resisting characteristics of a vulcanized rubber product can be readily ascertained by subjecting portions of the vulcanized product in a bomb to the action of 300 pounds of oxygen per square inch at a temperature of 70° C. The aged rubber samples are then examined and tested and the test data compared with the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending on the test. Alternatively, the age resisting characteristics of a vulcanized rubber product can be readily ascertained by subjecting portions of the vulcanized product to a constantly renewed stream of air in the Geer oven maintained at a temperature of 70° C.

The flex cracking resistance of the vulcanized rubber products may be determined on a flexing machine as set forth by L. V. Cooper, Analytical Edition of Industrial and Engineering Chemistry, vol. 2, No. 4, 1930, pages 391–394.

This invention comprises more particularly treating rubber with a reaction product of an aromatic primary amine and a ketone or derivative thereof in conjunction with a diaryl p-phenylene diamine as an adjuvant thereto whereby a rubber product possessing improved flexing and aging properties is obtained.

As specific examples of the reaction product of an aromatic primary amine and a ketone are the reaction product of acetone and aniline, reaction product of acetone and beta naphthylamine, reaction product of para phenetidine and acetone, reaction product of diacetone alcohol and aniline, reaction product of acetone and para amino diphenyl, the reaction product of methyl ethyl ketone and aniline, and equivalents and analogues thereof, which materials are obtainable by heating said reactants under pressure at a temperature of substantially 180° C. to 200° C. in the presence of a suitable catalyst or condensing agent. Where convenient or desirable other methods well known to those skilled in the art may be employed. As a further example of a ketone-aromatic primary amine reaction product included as one component of the preferred mixed antioxidant and flexing agent according to the present invention, substantially 100 parts by weight of a product formed by reacting acetone and aniline, comprising 2,2,4-trimethyl-dihydro-quinoline (see Reddelien and Thurm, Berichte der deutschen chemischen Gesellschaft, vol. 65, pages 1511–1521—(1932), were treated with 55 parts by weight of concentrated hydrochloric acid and heated therewith for 20 hours at a temperature of substantially 85° to 90° C. The crystalline salt-like product first produced changes to an amorphous mass, which on cooling formed a brittle solid. The material so formed, being acid in nature, was preferably neutralized before being incorporated in rubber. The product after neutralization melted at substantially 130 to 135° C. Other quantities of hydrochloric acid may be employed in the preparation of this class of ketone-aromatic primary amine reaction products. Thus, 100 parts by weight of 2,2,4-trimethyl-dihydro-quinoline has been treated with 10, 15, 25 and 30 parts by weight of concentrated hydrochloric acid in the manner analogous to that described above wherein 55 parts by weight of acid were employed. Further, other than concentrated acids may be employed. Thus, I may employ a dilute acid, as for example dilute hydrochloric acid. Again other acids may be employed. Thus, I may employ sulphuric acid.

As examples of diaryl p-phenylene diamines comprising the second component of the preferred class of antioxidants and flexing agents are diphenyl p-phenylene diamine, ditolyl p-phenylene diamine, dibeta naphthyl p-phenylene diamine and analogues and equivalents thereof.

As a specific embodiment of the invention but not as a limitation of the scope thereof rubber stocks were compounded as follows:

|  | Stock A— parts by weight | Stock B— parts by weight |
| --- | --- | --- |
| Smoked sheet rubber | 100. | 100. |
| Carbon black | 50. | 50. |
| Zinc oxide | 5. | 5. |
| Sulfur | 3. | 3. |
| Pine tar | 2. | 2. |
| Stearic acid | 3. | 3. |
| Benzothiazylthiobenzoate | 0.8 | 0.8 |
| Diphenylguanidine | 0.2 | 0.2 |
| Diphenyl p-phenylene diamine | --- | 0.4 |
| Hydrochloric acid treated 2,2,4-trimethyl-dihydro-quinoline | 1.0 | 0.6 |

The rubber stocks were vulcanized and the vulcanized rubber aged in the oxygen bomb at a temperature of 70° C. and under a pressure of 300 pounds of oxygen per square inch with the following result:

Table I

| Stock | Cure | | | Modulus of elasticity in lbs./in.$^2$ at elongation of 300% | Tensile at break in lbs./in.$^2$ | Ult. elong. % |
| --- | --- | --- | --- | --- | --- | --- |
|  | Mins. | Lbs. steam pressure | Hrs. aged |  |  |  |
| A | 75 | 30 | 0 | 2080 | 4300 | 520 |
| A | 75 | 30 | 96 | 1895 | 2850 | 450 |
| B | 75 | 30 | 0 | 2030 | 4195 | 540 |
| B | 75 | 30 | 96 | 2020 | 2795 | 420 |
| A | 90 | 30 | 0 | 1976 | 4360 | 530 |
| A | 90 | 30 | 96 | 2020 | 2705 | 415 |
| B | 90 | 30 | 0 | 2030 | 4290 | 530 |
| B | 90 | 30 | 96 | 2100 | 2765 | 410 |

An examination of the modulus and tensile figures contained in the above Table I shows that Stock B containing the mixed antioxidant according to the invention is materially better in age resistance than Stock A containing the hydrochloric acid treated 2,2,4-trimethyl-dihydro-quinoline alone. Moreover, when portions of the unaged rubber stocks were flexed in the manner hereinbefore set forth, the stock containing the mixture of diphenyl p-phenylene diamine and the hydrochloric acid treated 2,2,4-trimethyl-dihydro-quinoline was found by actual test to withstand 25% more flexings than the stock containing the hydrochloric acid treated 2,2,4-trimethyl-dihydro-quinoline alone. Portions of the above unaged vulcanized rubber stocks were artificially aged in the Geer oven for 3 and 5 days respectively and then flexed in the manner described above. Here again the stocks containing the preferred mixed antioxidant were found to flex markedly better than the stocks containing the hydrochloric acid treated 2,2,4-trimethyl-dihydro-quinoline alone. The preferred mixed antioxidant was found also to possess desirable solubility in the rubber mix. Diphenyl-p-phenylene diamine, when employed alone as an antioxidant in the above stock exhibits very poor solubility, and "blooms" or migrates to the surface of the vulcanized product within a few hours after vulcanization. This undesirable property renders it, when employed alone as an anti-oxidant, unfitted for commercial application.

Other ratios of a diaryl p-phenylene diamine, for example diphenyl p-phenylene diamine, and the hydrochloric acid treated 2,2,4-trimethyl-dihydro-quinoline have been employed in typical rubber stocks, and the resulting vulcanized rubber products found to possess improved flexing properties as well as improved solubility of diphenyl p-phenylene diamine in rubber. Thus, among other ratios, 0.2, 0.3 and 0.5 parts of diphenyl p-phenylene diamine have been employed in conjunction with 0.8, 0.7 and 0.5 parts of 2,2,4-trimethyl-dihydro-quinoline.

As a further example of the use of the preferred class of antioxidants rubber stocks were compounded comprising

|  | Stock C— parts by weight | Stock D— parts by weight |
| --- | --- | --- |
| Smoked sheet rubber | 100. | 100. |
| Carbon black | 50. | 50. |
| Zinc oxide | 5. | 5. |
| Sulfur | 3. | 3. |
| Stearic acid | 3. | 3. |
| Pine tar | 2. | 2. |
| Benzothiazylthiobenzoate | 0.8 | 0.8 |
| Diphenylguanidine | 0.2 | 0.2 |
| Diphenyl p-phenylene diamine | --- | 0.4 |
| Reaction product of acetone and beta naphthylamine | 1.0 | 0.6 |

The rubber stocks so compounded were vulcanized and the cured rubber product aged in the oxygen bomb at a temperature of 70° C. and a pressure of 300 pounds of oxygen per square inch, and the results obtained as given in Table II.

Table II

| Stock | Cure | | | Modulus of elasticity in lbs./in.$^2$ at elongation of 300% | Tensile at break in lbs./in.$^2$ | Ult. elong. % |
| --- | --- | --- | --- | --- | --- | --- |
|  | Mins. | Lbs. steam pressure | Hrs. aged |  |  |  |
| C | 75 | 30 | 0 | 1988 | 4050 | 565 |
| C | 75 | 30 | 120 | 1690 | 2310 | 440 |
| D | 75 | 30 | 0 | 1998 | 3985 | 530 |
| D | 75 | 30 | 120 | 1890 | 2505 | 415 |
| C | 90 | 30 | 0 | 1995 | 4020 | 540 |
| C | 90 | 30 | 120 | 1665 | 2150 | 400 |
| D | 90 | 30 | 0 | 2055 | 3860 | 500 |
| D | 90 | 30 | 120 | 1975 | 2370 | 385 |
| C | 105 | 30 | 0 | 2015 | 4020 | 520 |
| C | 105 | 30 | 120 | 1735 | 1990 | 340 |
| D | 105 | 30 | 0 | 2080 | 3875 | 500 |
| D | 105 | 30 | 120 | 1945 | 2230 | 350 |

The above data in Table II shows that the mixed antioxidant of the present invention possesses superior antioxidant properties to that of the reaction product of acetone and beta naphthylamine alone. Flexing tests, carried out in the manner described above on the unaged cured rubber stocks and on the same unaged stocks after aging for 3 and 5 days in the Geer oven at 70° C., showed Stock D containing the mixed antioxidant to be markedly superior to Stock C containing the acetone-beta naphthylamine reaction product alone as the antioxidant. The mixture of diphenyl p-phenylene diamine and the acetone-beta naphthylamine also was readily soluble in the rubber mix and did not exhibit any "blooming" or migration of antioxidant to the surface of the vulcanized rubber as does diphenyl p-phenylene diamine when employed alone in typical tread stocks.

As a further example of the use of the improved antioxidant of the present invention rubber stocks were compounded comprising

|  | Stock E—parts by weight | Stock F—parts by weight |
|---|---|---|
| Smoked sheet rubber | 100. | 100. |
| Carbon black | 50. | 50. |
| Zinc oxide | 5. | 5. |
| Sulfur | 3. | 3. |
| Stearic acid | 3. | 3. |
| Pine tar | 2. | 2. |
| Benzothiazylthiobenzoate | 0.8 | 0.8 |
| Diphenylguanidine | 0.2 | 0.2 |
| Reaction product of acetone and p-phenetidine | 1.0 | 0.7 |
| Diphenyl p-phenylene diamine | | 0.3 |

The stocks so compounded were vulcanized and the cured rubber product aged in the oxygen bomb at a temperature of 70° C. and an oxygen pressure of 300 pounds per square inch with the following result:

*Table III*

| Stock | Cure Mins. | Cure Lbs. steam pressure | Hrs. aged | Modulus of elasticity in lbs./in.² at elongation of 300% | Tensile at break in lbs./in.² | Ult. elong. % |
|---|---|---|---|---|---|---|
| E | 75 | 30 | 0 | 2145 | 3905 | 500 |
| E | 75 | 30 | 120 | 1640 | 1975 | 380 |
| F | 75 | 30 | 0 | 2110 | 4030 | 510 |
| F | 75 | 30 | 120 | 1770 | 2075 | 380 |
| E | 90 | 30 | 0 | 2120 | 3935 | 500 |
| E | 90 | 30 | 120 | 1644 | 1705 | 305 |
| F | 90 | 30 | 0 | 2140 | 4005 | 500 |
| F | 90 | 30 | 120 | 1825 | 2005 | 340 |
| E | 105 | 30 | 0 | 2115 | 3935 | 500 |
| E | 105 | 30 | 120 | | 1595 | 280 |
| F | 105 | 30 | 0 | 2075 | 3935 | 500 |
| F | 105 | 30 | 120 | 1810 | 1810 | 300 |

A comparison of the test data given in Table III above shows a marked improvement in the antioxidant action of the acetone-p-phenetidine reaction product when employed in conjunction with smaller amounts of a diaryl p-phenylene diamine, for example diphenyl p-phenylene diamine. Flexing tests carried out on the unaged vulcanized rubber stock and also on the same stock after aging for 3 and 5 days in the Geer oven at 70° C. showed in all cases a marked improvement in resistance to flex cracking of those stocks containing the acetone-p-phenetidine reaction activated by diphenyl p-phenylene diamine over those stocks containing the acetone-p-phenetidine reaction product alone. Furthermore, the mixture of the acetone-p-phenetidine reaction product and diphenyl p-phenylene diamine possesses desirable rubber solubility, whereas, as stated above, diphenyl p-phenylene diamine, when employed alone, does not.

As a further specific embodiment of the present invention rubber stocks were compounded comprising

|  | Stock G—parts by weight | Stock H—parts by weight |
|---|---|---|
| Smoked sheet rubber | 100. | 100. |
| Carbon black | 50. | 50. |
| Zinc oxide | 5. | 5. |
| Sulfur | 3. | 3. |
| Stearic acid | 3. | 3. |
| Pine tar | 2. | 2. |
| Benzothiazylthiobenzoate | 0.8 | 0.8 |
| Diphenylguanidine | 0.2 | 0.2 |
| Acetone-aniline reaction product | 1.0 | 0.6 |
| Diphenyl p-phenylene diamine | | 0.4 |

The compounded rubber stocks were vulcanized by heating in a press for 60, 75, 90 and 105 minutes at 30 pounds of steam pressure per square inch and portions of the cured rubber product flexed unaged and after aging for 3 days in the Geer oven at 70° C. The results of the flexing tests showed the rubber stock containing the mixture of the acetone-aniline reaction product and diphenyl p-phenylene diamine to be far more resistant to flex cracking than the stock containing the ketone-amine product alone. Furthermore, said mixed antioxidant was found to be rubber soluble.

From the specific examples hereinbefore set forth, it is shown that rubber compositions containing small proportions of the preferred class of materials markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the ones specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a product obtainable by treating 2,2,4-trimethyl-dihydroquinoline with a strong non-oxidizing mineral acid, and in addition thereto a diaryl p-phenylene diamine as an activator for said acid treated quinoline body.

2. The method of preserving rubber which comprises treating rubber with a product obtainable by treating 2,2,4-trimethyl-dihydroquinoline with hydrochloric acid, and in addition thereto a diaryl p-phenylene diamine as an activator for said acid treated quinoline body.

3. The method of preserving rubber which comprises treating rubber with a product obtainable by treating 2,2,4-trimethyl-dihydroquinoline with substantially 10 to 55 parts by weight of concentrated hydrochloric acid, and in addition thereto diphenyl p-phenylene diamine as an activator for said acid treated quinoline body.

4. A composition comprising rubber and a product obtainable by treating 2,2,4-trimethyl-dihydro-quinoline with a strong non-oxidizing mineral acid, and in addition thereto a diaryl p-phenylene diamine as an activator for said acid treated quinoline body.

5. A composition comprising rubber and a product obtainable by treating 2,2,4-trimethyl-dihydro-quinoline with hydrochloric acid, and in addition thereto by a diaryl p-phenylene diamine as an activator for said acid treated quinoline body.

6. A composition comprising rubber and a product obtainable by treating 2,2,4-trimethyl-dihydro-quinoline with substantially 10 to 55 parts by weight of concentrated hydrochloric acid, and in addition thereto diphenyl p-phenylene diamine as an activator for said acid treated quinoline body.

7. The vulcanized rubber product produced by heating rubber and sulfur in the presence of a product obtainable by treating 2,2,4-trimethyl-dihydro-quinoline with a strong non-oxidizing mineral acid, and in addition thereto a diaryl p-phenylene diamine as an activator for said acid treated quinoline body.

8. The vulcanized rubber product produced by heating rubber and sulfur in the presence of a product obtainable by treating 2,2,4-trimethyl-dihydro-quinoline with hydrochloric acid, and in addition thereto a diaryl p-phenylene diamine as an activator for said acid treated quinoline body.

9. The vulcanized rubber product produced by heating rubber and sulfur in the presence of a product obtainable by treating 2,2,4-trimethyl-dihydro-quinoline with substantially 10 to 55 parts by weight of concentrated hydrochloric acid, and in addition thereto diphenyl p-phenylene diamine as an activator for said acid treated quinoline body.

10. The method of preserving rubber which comprises treating rubber with an antioxidant comprising a major proportion of a product obtainable by treating 2,2,4-trimethyl-dihydro-quinoline with a strong non-oxidizing mineral acid, said acid treated quinoline being activated by admixture therewith of a minor proportion of a diaryl p-phenylene diamine.

11. A composition comprising rubber and an antioxidant comprising a major proportion of a product obtainable by treating 2,2,4-trimethyl-dihydro-quinoline with a strong non-oxidizing mineral acid, said acid treated quinoline being activated by admixture therewith of a minor proportion of a diaryl p-phenylene diamine.

12. The method of preserving rubber which comprises treating rubber with an antioxidant comprising a major proportion of a product obtainable by treating 2,2,4-trimethyl-dihydro-quinoline with substantially 10 to 55 parts by weight of concentrated hydrochloric acid, said acid treated quinoline being activated by admixture therewith of a minor proportion of diphenyl p-phenylene diamine.

13. A composition comprising rubber and an antioxidant comprising a major proportion of a product obtainable by treating 2,2,4-trimethyl-dihydro-quinoline with substantially 10 to 55 parts by weight of concentrated hydrochloric acid, said acid treated quinoline being activated by admixture therewith of a minor proportion of diphenyl p-phenylene diamine.

ROBERT L. SIBLEY.